May 13, 1952     M. KNOBEL     2,596,696
PNEUMATIC INSPECTION GAUGE
Filed June 20, 1946
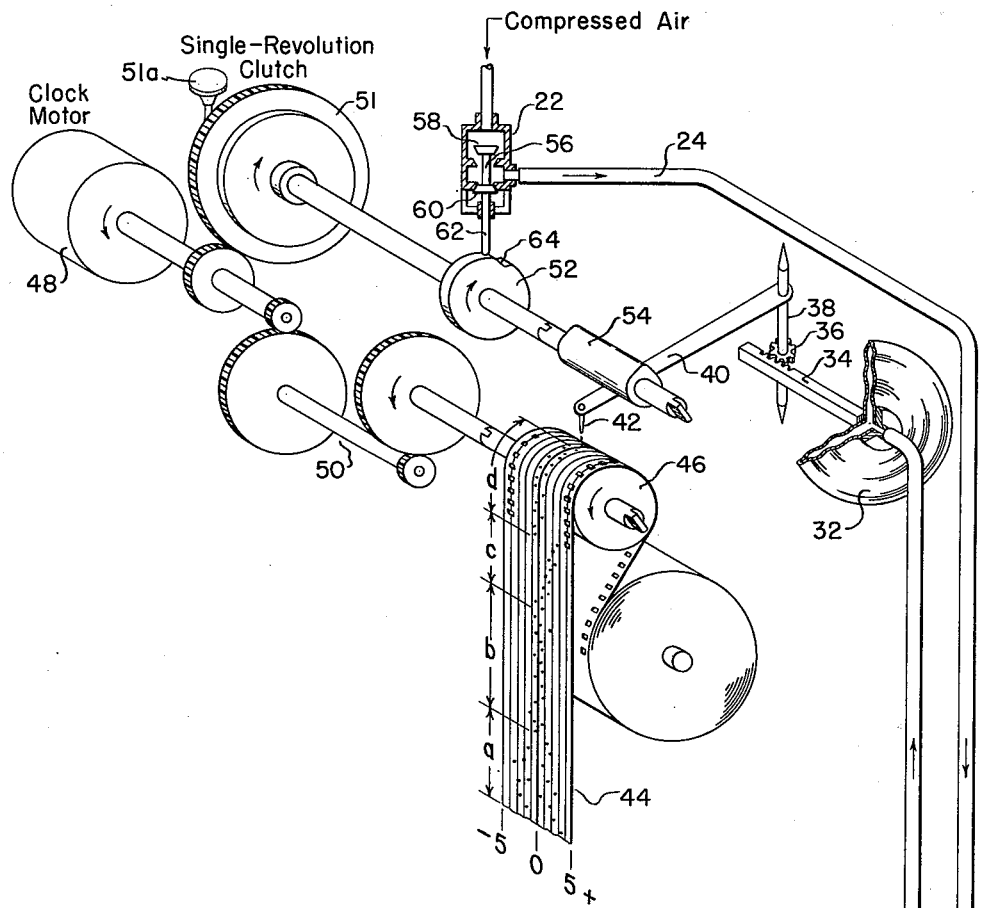
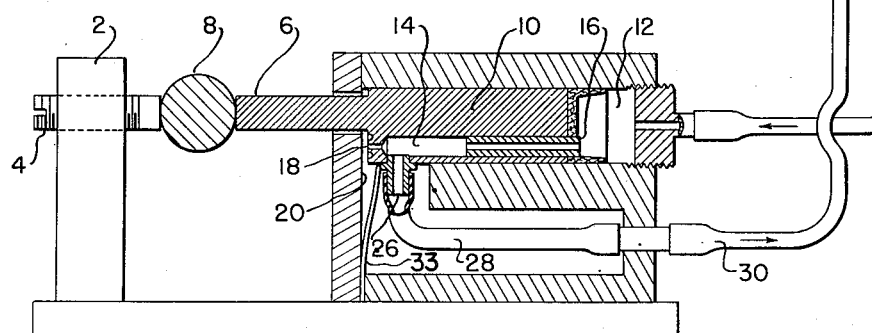
INVENTOR
Max Knobel
BY *Jenney & Hildreth*
ATTORNEYS Patented May 13, 1952

2,596,696

UNITED STATES PATENT OFFICE 2,596,696

PNEUMATIC INSPECTION GAUGE

Max Knobel, Arlington, Mass., assignor to K T Laboratories, Inc., Boston, Mass., a corporation of Massachusetts Application June 20, 1946, Serial No. 678,024

8 Claims. (Cl. 33—147)

The present invention relates to inspection gages.

Various types of gages have been developed for inspecting the dimensions of manufactured articles. Some are arranged to indicate the actual dimensions and some indicate whether the article is within or without rejection limits. The gages are used by the workmen who selects a piece for inspection intermittently and at random from the stock of manufactured articles.

The principal object of the present invention is to provide a gage which will maintain a charted record of the actual measurements. Further objects are to provide a semi-automatic gage which will replace the usual hand-calipering operations and also indicate to the operator the trend of dimensions to allow corrections to be made before the variations exceed tolerable limits.

With these objects in view the invention comprises a gage in which the operator may place a machine piece, together with means for automatically recording the gaged dimension. Preferably the recorder chart is operated continuously whereby the measurements of successive pieces are continuously shown, in order that the trend of operation may be continuously displayed to the operator. A further advantage of continuous operation is that it shows the distribution of measurements throughout the day and therefore provides check on the taking of measurements at definite and regular intervals.

Another feature of the invention contemplates a gage in which the measurement of size is determined by the measurement of air flowing through an orifice, in combination with an anvil which is brought into engagement with the work by the same pneumatic pressure which is utilized for the measuring operation. By this means the anvil is brought into engagement with the work with a substantially constant force.

Other features of the invention comprise certain novel features of construction and combinations and arrangements of parts hereinafter described and particularly defined in the claims.

The accompanying drawing is a diagram of the preferred form of inspection gage and recorder according to the present invention.

The gage comprises a head 2 within which is received an adjustable member 4, here indicated as a screw adapted for adjustment for different sizes of work. The work is measured between the end of the screw 4 and a movable anvil 6. The work is indicated in the drawing at 8.

The anvil 6 is formed at the end of a hydraulic piston 10 received in a cylinder 12. The piston has a longitudinal bore 14 which is partly filled with a tube 16 to afford a constricted passage. The end of the bore 14 terminates in an accurately formed nozzle 18 which is adapted to discharge air into proximity with an accurately formed face plate 20 which constitutes the front wall of the measuring apparatus.

Compressed air is supplied to the cylinder from a suitable source through a valve 22 (to be later described) and a tube 24 which connects with the rear of the cylinder. An air discharge connection 26 leads from the bore passage 14 through a flexible tube 28 which is connected through a tube 30 with the recorder, as will be later described.

A spring, indicated as a flat spring 33, bears against the front portion of the piston and tends to hold it in rearward position.

Upon introduction of compressed air into the cylinder the anvil 6 is moved into engagement with the work. The size of the work piece determines the relation of the nozzle 18 to the plate 20 and hence determines the air pressure in the line 30. Thus for work of proper size the nozzle 18 will come to a certain distance from the plate 20. If the work is too small the nozzle will reach a position closer to the plate, whereby less air will be discharged through the nozzle and a higher pressure will be applied to the connection 28. Conversely, if the piece is too large the discharge pressure in the tube 28 will be too low.

The recording equipment includes a diaphragm 32 connected with the tube 30. The diaphragm is connected through a rack 34 and pinion 36 with a spindle 38 journalled in suitable bearings and having an arm 40 provided at its end with a pointer 42. Upon depression of the arm 40 the pin strikes a recording tape 44 which is preferably driven continuously by the roller 46. The tape may be of any sensitive material such as wax coated or other pressure-sensitive paper or electrically-sensitive paper whereby a dot is made thereon when the pointer 42 is moved into contact therewith.

The drive for the recorder comprises a clock motor 48 connected through suitable gearing 50 with the drive roll 46. The clock motor shaft is also connected through suitable gearing with a single-revolution clutch 51 which drives a valve-operating cam 52 and a recorder cam 54, the latter being disposed immediately above the recorder arm 42. Suitable means is provided to cause operation of the clutch by the workman.

The valve 22 which is controlled by the cam 52 comprises a cylinder having a valve piston 56 provided with valve members 58 and 60 mounted on a stem 62. For the position shown in the drawing, which shows the positions of the parts at the start of a measuring operation, the single-revolution clutch 51 has been actuated, thereby causing the cam 52 to open the upper valve 58, whereby compressed air has been supplied to the cylinder 12 to move the anvil 6 into engagement with the work. During a later part of the revolution the lever 40 is depressed by the cam 54, thus forcing the pointer 42 into engagement with the recorder tape to make a mark thereon. At the completion of the revolution, the valve stem 62 drops into a depression 64 in the cam 52. This action closes the valve 58, thus cutting off the compressed air from the cylinder, and opens the valve 60 to relieve the compressed air from the system. The anvil is then retracted by the spring 33 and the work piece is removed.

A representative section of recorder tape is shown in the drawing. The tape is preferably provided with longitudinal lines to indicate deviations from the true dimension. If, for example, tolerances are to be held within 0.003" the tape may be provided with lines indicating deviations in steps of one thousandth of an inch. Thus, in the typical record shown in the drawing, the portion $a$ indicates that the dots are within the allowable limits but vary widely from plus to minus. This indicates a condition, such as looseness in the machine, which should be corrected. The portion of the tape designated $b$ indicates satisfactory operation within 0.001". At $c$ the dots are shown as veering off in the oversize direction, indicating tool wear or some similar condition which should be corrected. After correction the record shown at $d$ is obtained, indicating correct operation within close limits. (It will be understood that if the motor 48 is run continuously during machine adjustments and repairs, blank spaces may appear on the tape, as between $a$ and $b$ and between $c$ and $d$, but such spaces are not indicated on the drawing.) It will be observed from this typical record that any incipient errors in the machine can be discovered before the deviations in the manufactured pieces exceed tolerable limits so that corrections may be made before it is too late. It should be noted furthermore that if the workman has measured sample pieces at the proper intervals, the dots should be spaced fairly regularly on the chart. Accordingly, the record provides a check on the frequency and regularity of inspection. If desired, appropriate sections of the tape may be torn off and passed with the buckets of manufactured pieces, so that a definite record of quality is carried along with each batch.

It will be observed that the measurement may be quickly made, and furthermore, that the measuring anvil is brought to the work with a constant force by the air pressure, so that uniformity of measuring conditions is assured.

Having thus described the invention, I claim:

1. A gage comprising a piston having an anvil to engage the work, pneumatic means having an orifice movable with the anvil, a fixed plate, the distance of the orifice from the plate acting to measure a dimension of the work, and pneumatic connections for supplying fluid to operate the piston and for conveying part of the same fluid from behind the piston head to the orifice.

2. A gage comprising a piston having an anvil to engage the work, the piston having a measuring orifice movable with the anvil, a fixed plate, the distance of the orifice from the plate acting to measure a dimension of the work, means for supplying fluid to operate the piston and for conveying part of the same fluid from behind the piston head to the measuring orifice, and measuring means controlled by the flow of fluid through the orifice.

3. A gage comprising a piston having an anvil to engage the work, the piston having at one end a measuring orifice, a plate against which fluid is directed from the orifice at a rate depending on the position of the orifice relative to the plate, means for supplying fluid under pressure to move the piston into engagement with the work, and simultaneously for supplying fluid to the orifice, and measuring means controlled by the pressure in back of the orifice.

4. A recording inspection gage comprising a source of fluid under pressure, a valve to control flow from the said fluid source, a measuring anvil movable for engaging the work-piece, a piston for the anvil and having a head connected through the control valve to the fluid source for pneumatic operation, means having an orifice attached to the anvil, a fixed plate, the distance of the orifice from the plate acting to measure a dimension of the work indicated by the position of the measuring anvil, pneumatic connections for conveying part of the same fluid from behind the piston head to the orifice, recording means responsive to the flow of fluid through the orifice, means for operating the control valve to supply fluid for pneumatic operation of the anvil in engaging the work, and means operated at a fixed interval thereafter to actuate the recording means.

5. A recording inspection gage comprising a source of fluid under pressure, a valve to control flow from the said fluid source, a measuring anvil movable for engaging the work-piece, a piston for the anvil and having a head connected through the control valve to the fluid source for pneumatic operation, means having an orifice attached to the anvil, a fixed plate, the distance of the orifice from the plate acting to measure a dimension of the work indicated by the position of the measuring anvil, pneumatic connections for conveying part of the same fluid from behind the piston head to the orifice, recording means responsive to the flow of fluid through the orifice and means to open the control valve to supply fluid to operate the anvil, at a fixed time interval thereafter to actuate the recording means, and at a second fixed time interval thereafter to operate the control valve to relieve the fluid pressure at the anvil, thus releasing the work-piece.

6. A recording inspection gage comprising a source of fluid under pressure, a valve to control flow from the said fluid source, a measuring anvil movable for engaging the work-piece, a piston for the anvil and having a head connected through the control valve to the fluid source for pneumatic operation, means having an orifice attached to the anvil, a fixed plate, the distance of the orifice from the plate acting to measure a dimension of the work indicated by the position of the measuring anvil, pneumatic connections for conveying part of the same fluid from behind the piston head to the orifice, recording means responsive to the flow of fluid through the orifice, a single-revolution clutch, to be operated when it is desired to measure a work-piece, means for driving the clutch, and means operated by the clutch successively to open the control valve to supply fluid for pneumatic operation of the anvil, and measuring orifice, to actuate the recording means, and to close the control valve to release the measuring anvil from the work.

7. A recording inspection gage comprising a source of fluid under pressure, a valve to control flow from the said fluid source, a measuring anvil movable for engaging the work-piece, a piston for the anvil and having a head connected through the control valve to the fluid source for pneumatic operation, means having an orifice attached to the anvil, a fixed plate, the distance of the orifice from the plate acting to measure a dimension of the work indicated by the position of the measuring anvil, pneumatic connections for conveying part of the same fluid from behind the piston head to the orifice, recording means responsive to the flow of fluid through the orifice, the recording means including a record sheet and a marker, means for operating the control valve to supply fluid for pneumatic operation of the anvil in engaging the work, and means operated at a fixed interval thereafter to actuate the recording means.

8. A recording inspection gage comprising a source of fluid under pressure, a valve to control flow from the said fluid source, a measuring anvil movable for engaging the work-piece, a piston for the anvil and having a head connected through the control valve to the fluid source for pneumatic operation, means having an orifice attached to the anvil, a fixed plate, the distance of the orifice from the plate acting to measure a dimension of the work indicated by the position of the measuring anvil, pneumatic connections for conveying part of the same fluid from behind the piston head to the orifice, recording means responsive to the flow of fluid through the orifice, the recording means including a record sheet and a marker, a single-revolution clutch, means for driving the clutch and means operated by the clutch successively to open the control valve to supply fluid for pneumatic operation of the anvil, to actuate the recording means, and to close the control valve to release the measuring anvil from the work.

MAX KNOBEL.

REFERENCES CITED

The following references are of record in the file of this patent:

UNITED STATES PATENTS

| Number | Name | Date |
| --- | --- | --- |
| 693,990 | Arndt | Feb. 25, 1902 |
| 1,112,845 | Schubert | Oct. 6, 1914 |
| 1,861,697 | Hickok et al. | June 7, 1932 |
| 1,954,442 | Dall et al. | Apr. 10, 1934 |
| 2,150,070 | Kregecz | Mar. 7, 1939 |
| 2,244,864 | Witham, Jr. | June 10, 1941 |
| 2,295,399 | Hanna | Sept. 8, 1942 |
| 2,369,319 | Smith | Feb. 13, 1945 |
| 2,374,154 | Moore | Apr. 17, 1945 |
| 2,397,494 | Kuppersmith | Apr. 2, 1946 |
| 2,404,750 | Schmidt | July 23, 1946 |